Inventors
Sigmund A. Gratcyk
Arthur L. McWethy
Thomas P. Russell
Blanche Eibink
By Lieurance and Van Antwerp
Attorneys

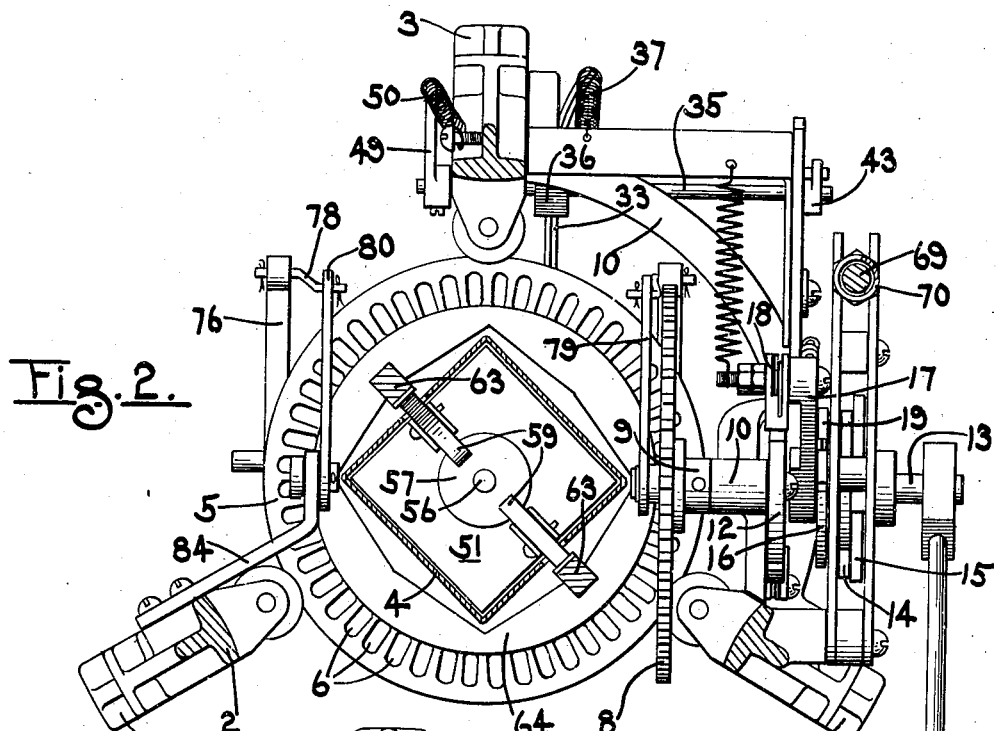
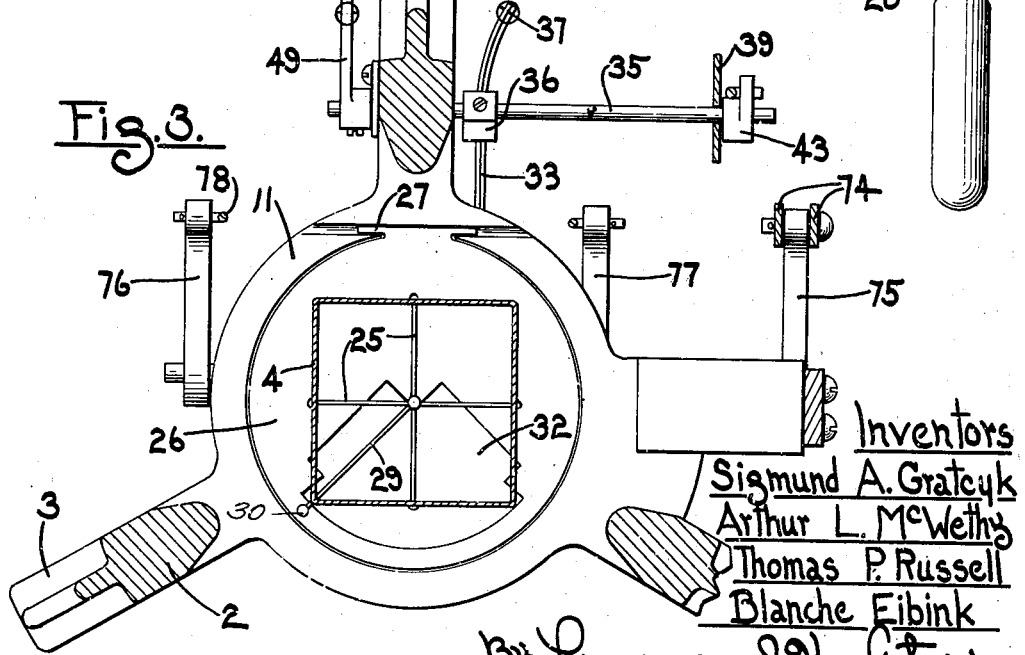

Inventors
Sigmund A. Gratcyk
Arthur L. McWethy
Thomas P. Russell
Blanche Eibink
Attorneys

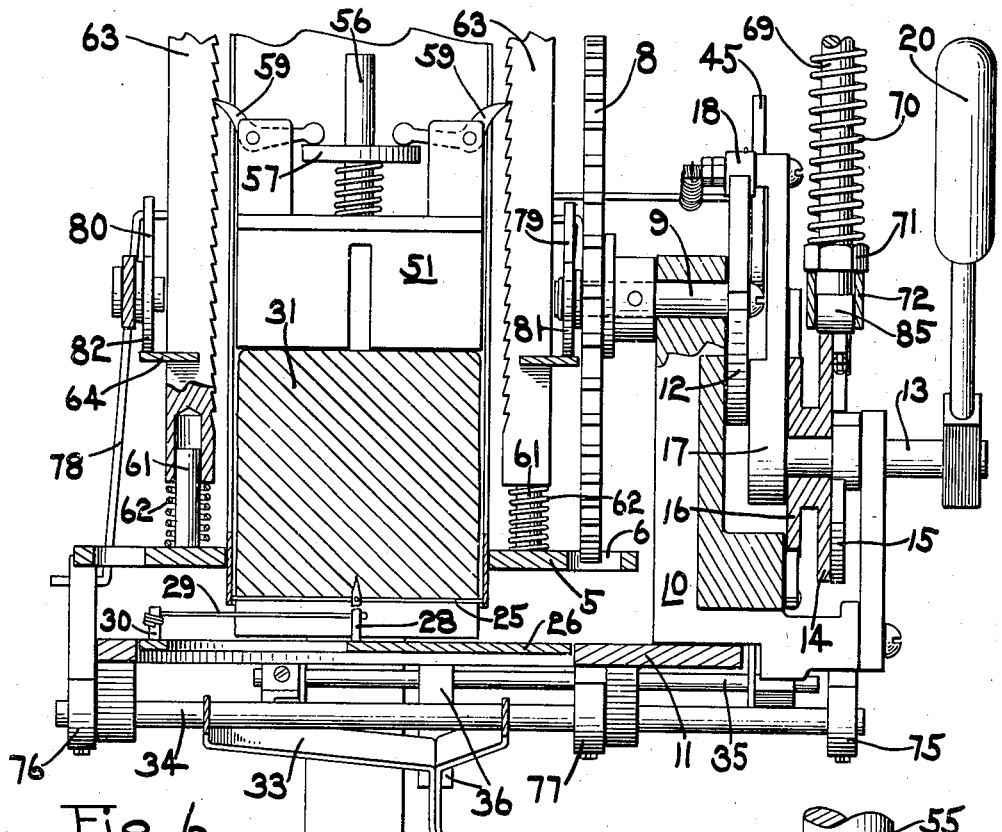
Fig. 6.
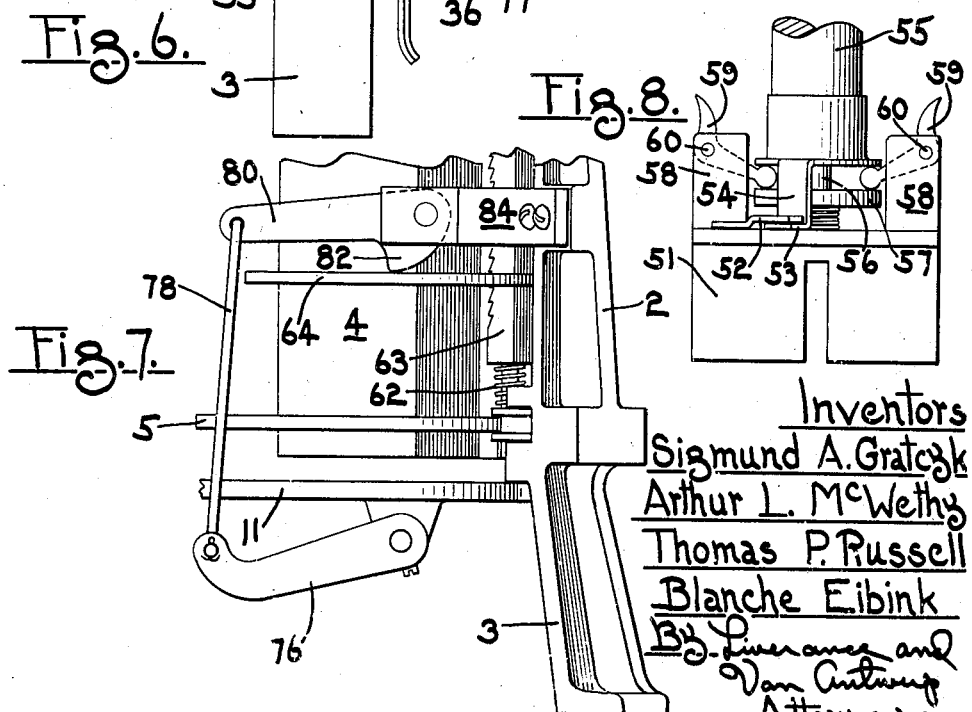
Fig. 8.
Fig. 7.
Inventors
Sigmund A. Gratcyk
Arthur L. McWethy
Thomas P. Russell
Blanche Eibink
By Liverance and
Van Antwerp
Attorneys Patented July 29, 1941

2,250,760

UNITED STATES PATENT OFFICE 2,250,760

DISPENSING MACHINE

Sigmund A. Gratcyk, Arthur L. McWethy, Thomas P. Russell, and Blanche Eibink, Grand Rapids, Mich.

Application October 10, 1938, Serial No. 234,130

12 Claims. (Cl. 31—24)

This invention relates generally to a dispensing machine and is more specifically directed to an apparatus for cutting and dispensing butter in small cubes as are generally served in restaurants.

The principal object of our invention is to provide a device which may be operated manually to cut and dispense from the usual pound size cube of butter a plurality of small cubes or pats, one at a time during each operation of the manually operable means.

Another object is to provide a shell for guiding the butter to be cut onto the cutting means and for rotating the shell a predetermined arc of a circle during each operation of the manually operable means.

A still further object is to provide a means which may be inserted in the shell to maintain the butter constantly in contact with the cutting means and to provide other automatic means whereby the butter may be forced a short distance through the shell each time said shell has been rotated through 360 degrees.

Still another object of our invention is to provide means near one end of the shell or guiding means which will dispense a single cube of butter after it has been cut, this operation taking place automatically at the end of each operation of the manually operable means.

Other objects of the invention will appear as the description proceeds.

To the accomplishment of the foregoing and related ends, said invention, then, consists of the means hereinafter fully described and particularly pointed out in the claims.

The annexed drawings and following description set forth in detail certain means for carrying out the invention, said means constituting, however, but one of several ways in which the principle of the invention may be employed.

In said annexed drawings, wherein like reference characters refer to like parts in the various figures:

Fig. 2 is a top plan view of the device with certain parts thereof shown in section.

Fig. 3 is a horizontal sectional view of the device with a portion of the actuating mechanism removed therefrom which discloses mainly the supporting structure, and the dispensing means.

Fig. 6 is an enlarged fragmentary front view of the device partly in section and partly in elevation.

Fig. 7 is a fragmentary side elevational view showing the side opposite from that shown in Figs. 1, 4, and 5.

Fig. 8 is an elevational view of the means which is operated upon to force the butter through the guiding shell after said shell has rotated through 360 degrees.

Figure 1:
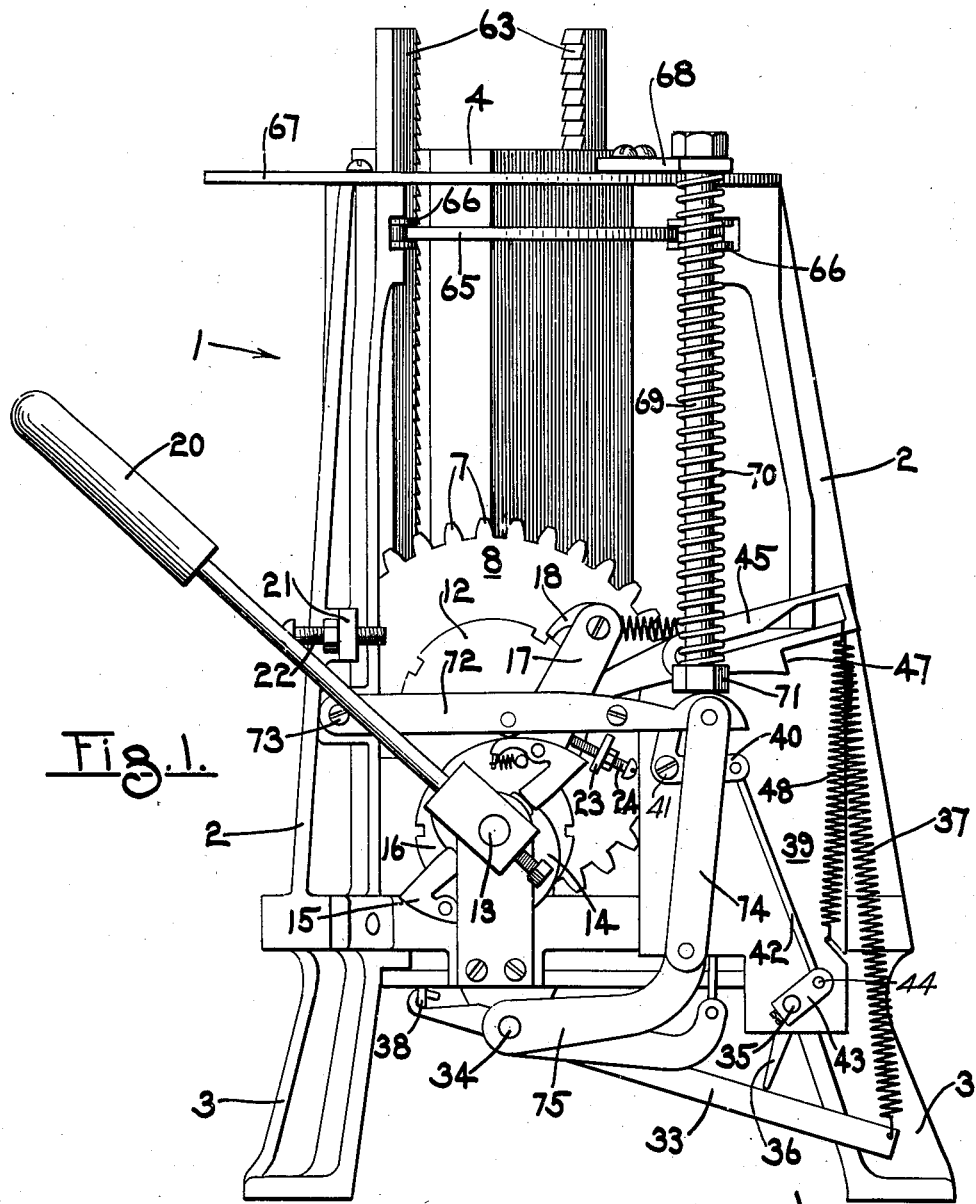
Fig. 1 is a side elevational view of our dispensing apparatus.

We have designed our apparatus primarily for the cutting and dispensing of butter. However, it is our intention that any other substance either of a plastic nature or one which adapts itself well to being cut and dispensed in small quantities, may be used in our machine, without in any way departing from the spirit of the invention.

Furthermore, we have designed our device so that the shell or guiding means for the substance to be dispensed is disposed in a vertical plane, but it is also within the scope of our invention that such guiding means may also be placed in other positions than vertical without departing from the spirit of the invention, providing of course that substantially the same mechanism is used to operate the device.

Our apparatus consists generally of a supporting structure which includes a plurality of upright members, the bottom portions of which are intended to be utilized as legs for supporting the device in its entirety. Near the bottom of these upright members and between the same extends a plate which has the center portion thereof removed to form a substantially ring-shaped member.

Above this ring-shaped member is positioned a circular plate having a plurality of openings therethrough and adapted to receive therein the teeth of a gear which is positioned in a vertical plane thereabove. This engagement operates to rotate the guiding shell which is secured to the first mentioned plate. It is our intention, however, that this specific construction need not necessarily be used in order to rotate the guiding means, since beveled gears or other well-known means for transmitting a vertical rotary motion to a horizontal rotary motion may be used.

A lever arm is positioned at one side of the device connected to spring means and a plurality of ratchet wheels so that for each operation of the lever arm the guiding shell will be rotated through a 90 degree arc, although it is conceivable that the arc through which the guiding shell may be rotated during each operation of the lever may be varied to any desirable number of degrees. The above mentioned spring means is indirectly connected to a pair of vertically positioned racks and is adapted to be released every fourth operation of the lever arm, that is to say, each time the guiding means has been rotated through 360 degrees. The vertically positioned rack means, acting in conjunction with the spring means, will force the butter, or substance to be dispensed, downwardly through the guiding means a predetermined distance each time the spring means is released.

Referring now more particularly to the drawings, the numeral 1 generally indicates the dispensing machine. The supporting structure is composed specifically of a plurality of upright members 2 having bottom portions thereon acting as legs and indicated by the numerals 3.

The vertically positioned shell 4 into which the butter, or other substance to be dispensed is placed, is positioned at its lower end in a horizontal plate 5. The opening in said plate 5 is intended to be of substantially the same shape as the shell 4 so that when the plate is rotated said shell will also rotate with it.

The plate 5, around its peripheral edge contains a plurality of openings 6 which are adapted to receive the teeth 7 of the gear 8. Thus it will be seen that any rotary movement imparted to the gear 8 will thereby be transmitted to the plate 5 and the shell 4.

The gear 8 is secured near one end of the shaft 9 which extends through a bearing 10, extending upwardly from a second plate 11 also extending between the leg members 3 and positioned below the plate 5. To the other end of the shaft 9 is secured a ratchet wheel 12.

A second shaft 13 is positioned below the shaft 9 and also extends through the bearing member 10. On this shaft is positioned the cam member 14 which has secured thereto spring operated members 15 disposed on said cam at positions diametrically opposite each other. These members are pivoted on the cam 14 at points 15a, while each of the springs 15b is secured at one end to one of the pins 15c and at its other end to the projection on an end of the member 15. Also fixed to the shaft 13 is the ratchet wheel 16 and an arm 17 which extends upwardly therefrom and has pivotally secured to its outer end at 18a a pawl 18 held by the spring 18b which is adapted to coact and operate the ratchet wheel 12 for the purpose of rotating the gear 8. Near the center of the arm 17 is also pivotally secured a pawl 19 which acts to operate the ratchet wheel 16 upon rotation of shaft 13. The pivotal point of the pawl 19 is at 19a on the arm 17 and has a spring 19b which is secured at one end to pawl and at its other end to the pin 19c for holding the pawl in engagement with the ratchet 16.

At the outer end of the shaft 13 is secured the handle 20. It will thus be seen that on operating the handle 20 to rotate the shaft 13, the cam 14, the ratchet wheel 16, the arm 17, and the ratchet wheel 12 will all be rotated due to such downward motion of the handle. When the ratchet wheel 12 is rotated it also rotates the shaft 9 and the gear 8, which in turn will act to rotate the plate 5 and the shell 4.

Figure 4:
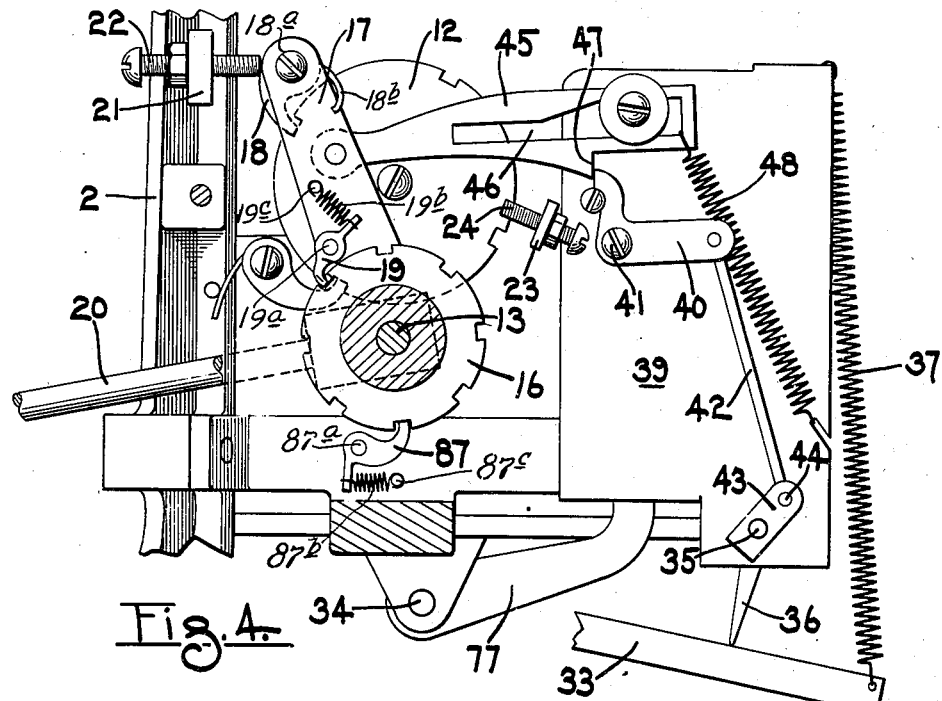
Fig. 4 is a fragmentary side elevational view of the device showing parts thereof in section and having a portion of the actuating mechanism removed therefrom to show the ratchets and the lever arm in a down position at the end of one stroke.

Referring now specifically to Figs. 1 and 4 it will be seen that an ear 21 extends outwardly from one of the upright portions 2 and has threaded therein adjusting means such as the screw threaded member 22. This is located at that point, as will be seen in Fig. 4, for the express purpose of limiting the forward movement of the arm 17, and consequently the downward movement of the handle 20.

Extending outwardly from the support or bearing 10 is a second ear 23 which supports a similar adjusting means or screw threaded member 24 which acts to limit the rearward movement of the arm 17, as shown in Fig. 1, and consequently the upward motion of the handle 20. These various adjustments may be made to vary the number of degrees through which the shell 4 may be turned.

Across the bottom of the shell 4 are stretched wires 25 at right angles to each other to act as cutting elements so that when the substance to be dispensed is forced downwardly these cross wires cut the substance into four sections in a vertical plane. It is intended that means other than wire may be used for cutting without departing from our invention.

Within the opening of the plate 11 a disk 26 is positioned which is pivotally mounted in the plate 11 by the pin 27 (Fig. 3). At the center of the disk 26 a small pin 28, see Fig. 6, extends upwardly and a wire 29 is secured thereto at one end and is secured at its outer end to a second upwardly extending pin 30 which is positioned near the edge of the disk 26. The wire 29 and the disk 26 are adapted to remain stationary with respect to the rotary motion of the plate 5 and the shell 4, so that when the butter, designated by the numeral 31 in Fig. 6, is pressed downwardly the wires 25 first divide it into four equal parts, and due to the rotation of the shell and the butter the wire or cutting means 29 acts to cut in a horizontal plane one of the sections so divided by the wires 25. At the end of this horizontal cutting operation by the means 29, the disk 26, which has a portion of its center removed as at 32 in Fig. 3, and wire 29 will be lowered a short distance about the pivotal point of the pin 27 by means which will hereinafter be more fully described. This motion by the disk 26 and the wire 29 acts to dispense the portion of the substance cut, since such portion so cut, in a substance of this type, would otherwise tend to adhere to the main body of such substance.

The mechanism which actuates the pivotal movement of the disk 26 and the wire 29 consists of a pair of arms 33 loosely mounted on a shaft 34. The arms 33 converge and extend outwardly together in substantially a Y shape. A second small shaft 35 has secured thereto a finger 36, preferably of a V-shaped construction, having its smaller end in contact with the arms 33. The spring 37 tends to urge the arms 33 upwardly. Each of the arms 33 extends beyond the shaft 34, as in Fig. 1, and hooks onto one of a pair of pins 38 which are secured to the bottom of the disk 26. Thus it will be seen that upon movement of the shaft 35 in a clockwise direction the finger 36 will be moved toward the left, allowing the spring 37 to move the arms 33 upwardly on one side of the shaft 34 and downwardly on the other side of said shaft. The downward movement of the arms on the other side of the shaft 34, the arms being secured to pins 38 on the disk 26, will urge said disk downwardly about the pin 27 as its pivotal point.

The manner in which the clockwise rotation of the shaft 35 is accomplished may be more easily seen by viewing Fig. 4. A plate 39 is secured to the portion of the bearing and guide member 10 which extends between two of the uprights 2, as shown in Fig. 2. On the face of this plate is secured a small arm 40 which has an L shape and is pivoted to the plate at 41, thereby effecting a bell crank movement of the arm. At the outer end of one of the arms of the bell crank 40 is pivotally secured a link 42 which has its other end pivotally secured to a smaller link 43 at the point 44, and which is in turn rigidly secured to the shaft 35.

Pivotally secured to the arm 17 is a slotted arm 45 containing a slot 46 and a portion in the form of an offset at the bottom thereof as indicated at 47, for the purpose of contacting one of the arms of the bell crank 40. A spring 48 is secured to the outer end of the slotted arm 45 for the purpose of urging it in a downward direction.

As shown in Fig. 4, when the handle 20 is in its downward position and the arm 17 has been moved until it strikes the stop means 22, it has drawn the slotted arm 45 into a position whereby the offset 47 is in contact with one arm of the bell crank 40. When the handle is released the arm 17 and the slotted arm 45 will be moved toward the right, and as this operation takes place the horizontal arm of the bell crank 40 will be urged in a downward direction forcing the small link 43 to rotate in a clockwise direction as well as the shaft 35. The manner in which the disk 26 is pivotally actuated upon rotation of the shaft 35 has been explained above. It will be obvious that the offset 47 will be in contact with the upper arm of the bell crank 40 for only a short distance, as this end of the slotted arm 45 will tend to move upwardly and out of contact with said arm, as shown in Fig. 1.

The opposite end of the shaft 35 has an arm 49, see Fig. 2, secured thereto to the outer end of which is secured a spring 50 which will rotate the shaft 35 in a counterclockwise direction and return the various elements to their normal position as shown in Fig. 4, immediately after the offset 47 has ceased to contact the upper arm of the bell crank 40.

Fig. 8 shows the element used to force the substance to be dispensed in a downward direction through the shell 4 and is denoted by the numeral 51. On the top of this element diagonally across from each each other are two members 52 which are adapted to receive the outwardly extending ends 53 of arms 54 secured to a handle member 55. This particular arrangement is utilized merely for the purpose of removing the element 51 from the bottom of the shell 4 in order to insert therein more butter to be dispensed. It will be obvious that any other suitable arrangement for securing a handle to the element 51 could be used if desired. A small shaft 56 extends upwardly through the center of the element 51 and has secured thereto a disk 57. A spring around the bottom of the shaft 56 and between the top of element 51 and the disk 57 is for the purpose of urging the ends 53 of the arms 54 upwardly to prevent slipping.

On either side of the top of the element 51 and extending upwardly therefrom are small channel members 58. Between the sides of these channel members are located L-shaped arms 59, which are pivoted respectively to said channel members each at 60. See Fig. 8. The purpose of these L-shaped arms 59 will be hereinafter more fully described.

Extending upwardly from the disk 5 diametrically opposite each other are pins 61 on which are positioned spring members 62. Extending upwardly above the pins 61 are rack members 63 which have openings in the bottoms thereof and adapted to slide over the pins 61. Ring-shaped braces 64 and 65 are secured to the racks 63 for the purpose of steadying same, and the brace 65 is positioned in roller guide members 66. See Fig. 1.

After the butter or substance to be dispensed has been inserted in the shell 4, the weight or element 51 is inserted in the top of said shell and forced downwardly by hand until it contacts the top of said substance. The element 51 is so positioned in the shell 4 that the outer ends of the arms 59 contact the teeth of the rack members 63, thereby preventing either the removal or the raising of the element 51 until contact has been broken between the teeth of the rack 63 and the arms 59.

Immediately after a complete revolution of the plate 5 and the shell 4 has taken place, and one complete slice has been removed from the bottom of the butter, the racks 63 move downwardly a sufficient distance so as to place the bottom portion of the butter in a position ready for another complete slice to be removed. During each operation or movement of the lever 20 the racks 63 are raised a slight distance, which is in this case one-fourth of each of the downward movements of the element 51 and the substance 31. Every fourth time that the arm 20 is lowered, the racks 63 having been raised this small distance four times, and upon release of the handle 20 each fourth time, the racks 63 will be released, thereby forcing the element 51 and the substance 31 downwardly the desired distance.

The manner in which this operation is accomplished and the mechanism involved therein follows.

Around the top of the upright members 2 is secured a ring 67. At one side of this ring extends an arm 68 to the outer end of which is secured an upright shaft 69 around which is located a spring 70. Near the bottom of said shaft 69 is slidably mounted a nut 71. An arm 72 pivotally mounted at 73, has one end extending below the nut 71 so that when the right end of the arm 72 is raised the spring 70 will be compressed. The arm 72 is split so that the shaft 69 may extend downwardly between the right hand ends thereof.

To one end of the arm 72 is pivotally secured a link 74, which is in turn pivotally secured at its opposite end to another arm 75 which is secured at its outer end to the shaft 34. A second arm 76 similar to arm 75 is situated at the opposite end of the shaft 34, as shown in Fig. 6, and intermediate the arms 75 and 76 is a similar arm 77 also secured to the shaft 34. Extending upwardly from the arms 76 and 77 are links 78 which are secured at their upper ends to horizontally extending arms 79 and 80. Each of the arms 79 and 80 have portions extending outwardly and downwardly near one end thereof, and indicated by the numerals 81 and 82, which contact the plate 64. The arm 79 is pivotally secured at its inner end to a shaft 9, while the arm 80 is pivotally secured to a support 84 secured to one of the uprights 2 for that purpose.

The springs 62 around the lower ends of the racks 63 tend to urge said racks upwardly, but this action is prevented by the downwardly extending portions 81 and 82 on the arms 79 and 80, until said arms are allowed to be raised out of contact of the plate 64, the springs 62 then urging the racks 63 and the plate 64 upwardly until it again contacts the portions 81 and 82.

Figure 5:
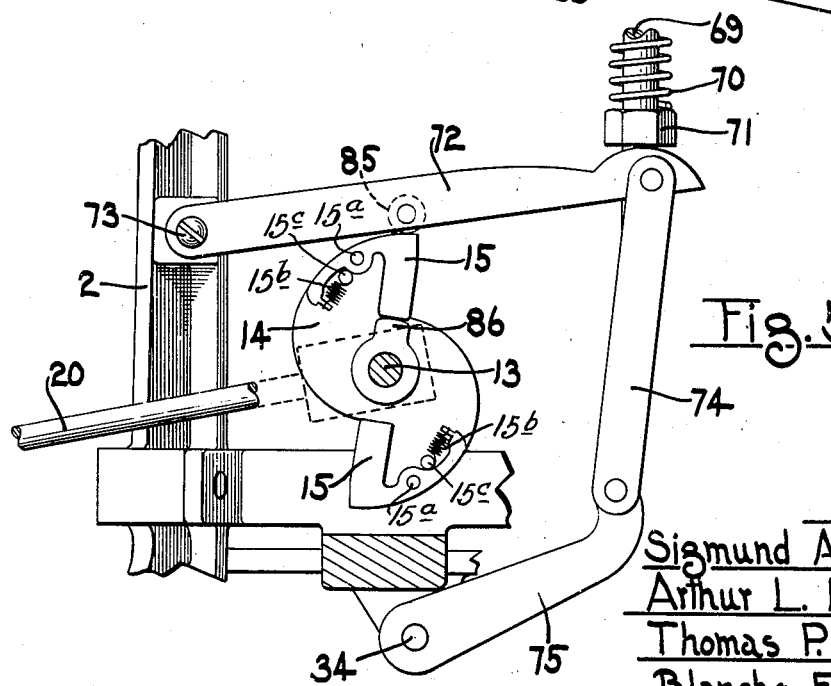
Fig. 5 is a fragmentary side elevational view with a portion of the mechanism removed therefrom to show the cam member in a position immediately before release of the mechanism which forces the butter a short distance through the shell after said shell has been rotated through 360 degrees.

Since the arms 79 and 80 are connected indirectly to and are actuated by the arms 72 and the links 74 and 75, as above explained, it will be seen that by raising the right end of the arm 72, the members 81 and 82 will also be raised and allow the rack members 63 to also be moved in an upward direction, and that when the right end of the arm 72 is moved downwardly, the spring 70 acting to accomplish this, the rack members 63 will also be forced downwardly taking with them the element 51, thereby forcing the butter downwardly simultaneously. As has been seen before, a downward motion of the handle 20 will rotate the shaft 13 and consequently the cam 14. At substantially the mid point of the arm 72 is rotatably mounted a roller member 85 which is in constant contact with the cam member 14. The cam is of such configuration that each time the handle 20 is lowered the cam moves a short distance, thereby raising the arm 72 a proportionate distance. This operation continues during each stroke of the handle for four consecutive times and at the end of the fourth stroke, on its return to its normal position, the cam will be situated as shown in Fig. 5. The small lug 86 will be in contact with one of the spring supported and pivotally mounted members 15 and as the lug 86 moves toward the right upon a clockwise rotation of the shaft 13, the cam will remain stationary due to the action of the small bell crank arrangement 87, one end of which will contact the grooves of the ratchet wheel 16, which ratchet member is also secured to the shaft 13. The bell crank 87 is pivotally mounted on the frame at 87a and is provided with a spring 87b secured at one end to the pin 87c and at its other end to one of the arms of the bell crank to normally hold it in engagement with the ratchet wheel 16. The lug 86, however, as it moves in a clockwise direction, will move out of contact with the member 15 which will spring inwardly, allowing the arm 72 to be suddenly lowered.

It will therefore be seen that during four consecutive operations of the handle 20 the arms 72 and consequently the racks 63 are being constantly raised until the return of the handle 20 to its normal position at the fourth operation, at which time the arm 72 and the ratchets 63 are lowered the desired distance to place the butter in position where another complete slice may be removed.

The complete operation of the device is substantially as follows:

Assuming that the butter and the element 51 are in place and the machine is in readiness for operation, the handle 20 is lowered for the first time. During the lowering of the handle the plate or gear member 5 will be rotated in a clockwise direction, as viewed in Fig. 2, permitting the wire 29 to make a horizontal cut throughout the rotation of said plate 5 and shell 4, in this case 90 degrees. At the same time the arm 20 actuating the cam 14 will raise the arm 72 a short distance which in turn acts to raise the rack 63. Also during this operation the slotted arm 45 has been moved forwardly a sufficient distance so that its offset portion 47 will contact the upwardly extending arm of the bell crank 40.

In this position the butter has been cut vertically and horizontally, but since the portion so cut will tend somewhat to adhere to the main body of the substance a short dispensing movement becomes necessary. This is accomplished upon return of the handle 20 to its normal position by moving the slotted arm 45 toward the right, releasing the finger 36 and tipping the disk 26 and the wire 29 downwardly. At this point, one-fourth of a complete slice has been cut and extruded, or dispensed. During the second operation of the handle 20, identically the same movements take place with the exception that the rack members 63 are raised still higher, otherwise all parts remain in the same relationship to each other. This continues for four consecutive times until the arm 72 is released as above described with respect to Fig. 5, at which time the rack members 63 force the element 51 and the butter 31 downwardly and place said butter in a position whereby another complete slice may be removed.

It will thus be seen that we have constructed a device for the dispensing of butter or other substance of a similar nature, whereby the same may be dispensed in small cubes ordinarily used in restaurants, merely by the placing therein of the usual pound size cube, and by a single manual operation.

Other modes of applying the principle of our invention may be used instead of the one here explained, change being made with regard to the various mechanism shown, provided, however, that the means stated by any of the following claims or the equivalent of such stated means be employed.

We therefore particularly point out and distinctly claim as our invention:

1. A dispensing apparatus comprising, a supporting structure, a shell supported by said structure to guide the substance to be dispensed, vertical cutting means in said shell, horizontal cutting and discharging means pivotally mounted near one end of said shell and actuating means to simultaneously operate said cutting and discharging means.

2. A dispensing apparatus comprising, a supporting structure, means mounted on said structure to guide the substance to be dispensed, means to rotate said guide means, means to cut said substance in a vertical plane, means movable in only a single plane to both cut said substance in a horizontal plane and dispense the amount so cut, means to maintain said substance in constant contact with said vertical cutting means, and means to force said last named means a predetermined distance through said guide means each time said guide means is rotated through 360°.

3. The combination of elements defined in claim 2, said horizontal cutting and dispensing means including a plate, a portion of which has been cut out, and a wire stretched tightly from the center of said plate to a point near the edge thereof, said plate being pivotally secured at a point on the edge thereof to a portion of said supporting structure, said wire being adapted to cut said substance while the substance is being rotated, and means to move said plate and wire downwardly on said pivot at the end of each cutting operation.

4. The combination with a dispensing apparatus having rotatable guide means for the substance being dispensed, means to force the substance through the guide means and means to rotate said guide means, of means to move said forcing means and said substance longitudinally through said guide means a predetermined distance upon completion of each full rotation of said guide means comprising, a rack located at a side of the guide means, a pawl on said forcing means cooperatively associated with said rack, means to move said rack in a direction opposite to the direction of periodic movement of the forcing means each time said guide means is rotated less than 360°, said last named means also permitting movement of said rack and said forcing means in a direction to dispense said substance at the completion of a 360° rotation of said guide means.

5. The combination of elements defined in claim 4 combined with pivotally mounted means to horizontally cut and dispense said substance at the conclusion of each partial rotation of said guide means.

6. The combination of elements defined in claim 4 combined with means to regulate the arc through which the guide means may be rotated during each dispensing operation.

7. The combination with a dispensing apparatus having rotatable guide means for the substance being dispensed, means to cut said substance longitudinally, and manually operable means for rotating said guide means, of means for laterally cutting and dispensing said substance comprising, a tiltably mounted plate, a wire stretched taut from the center of said plate to the periphery thereof, a pivotally mounted lever arm connected to one side of said plate, spring means normally tending to tilt said plate, means interposed against said lever to hold said plate against tilting, and means to remove said last named means from the path of movement of said lever arm upon return of said manually operable means to normal position, whereby said plate will be tilted thereby dispensing a portion of said substance.

8. The combination of elements defined in claim 7 combined with means to urge said substance longitudinally of said guide means, a rack located longitudinally of said guide means, a pawl on said urging means to cooperate with said rack, means to move said rack a short distance in a direction away from the dispensing end of the guide means each time the manually operable means is actuated, said means also permitting a movement of said rack and said urging means a predetermined distance toward the dispensing end of the guide means after said guide means has completed a 360° rotation.

9. A dispensing apparatus comprising, a supporting structure, means for guiding the substance being dispensed, means to rotate said guide means, means in said guide means to cut the substance in one direction, and cutting means movable only in a substantially vertical plane to both cut the substance in another direction and to discharge the portion of the substance so cut.

10. A dispensing apparatus comprising, a supporting structure, vertically disposed rotatably mounted guide means on said structure to guide the substance being dispensed, means to rotate said guide means, cutting means to cut the substance in a vertical direction and means movable only in a substantially vertical plane to both cut the substance horizontally and dispense same in consecutive operations.

11. A dispensing apparatus comprising, a supporting structure, means for guiding the substance being dispensed, means to rotate said guide means, means in said guide means to cut the substance in one direction, tiltably mounted cutting means to both cut the substance in another direction and to discharge the portion of the substance so cut, and means to automatically and simultaneously actuate said rotating means and both of said cutting means.

12. A dispensing apparatus comprising, a supporting structure, vertically disposed rotatably mounted guide means on said structure to guide the substance being dispensed, means to rotate said guide means, cutting means to cut the substance in a vertical direction and means to both cut the substance horizontally and dispense same in consecutive operations, said means to rotate the guide means also acting simultaneously to operate said last named cutting and dispensing means.

SIGMUND A. GRATCYK.
ARTHUR L. McWETHY.
THOMAS P. RUSSELL.
BLANCHE EIBINK.